United States Patent Office 3,056,543
Patented Oct. 2, 1962

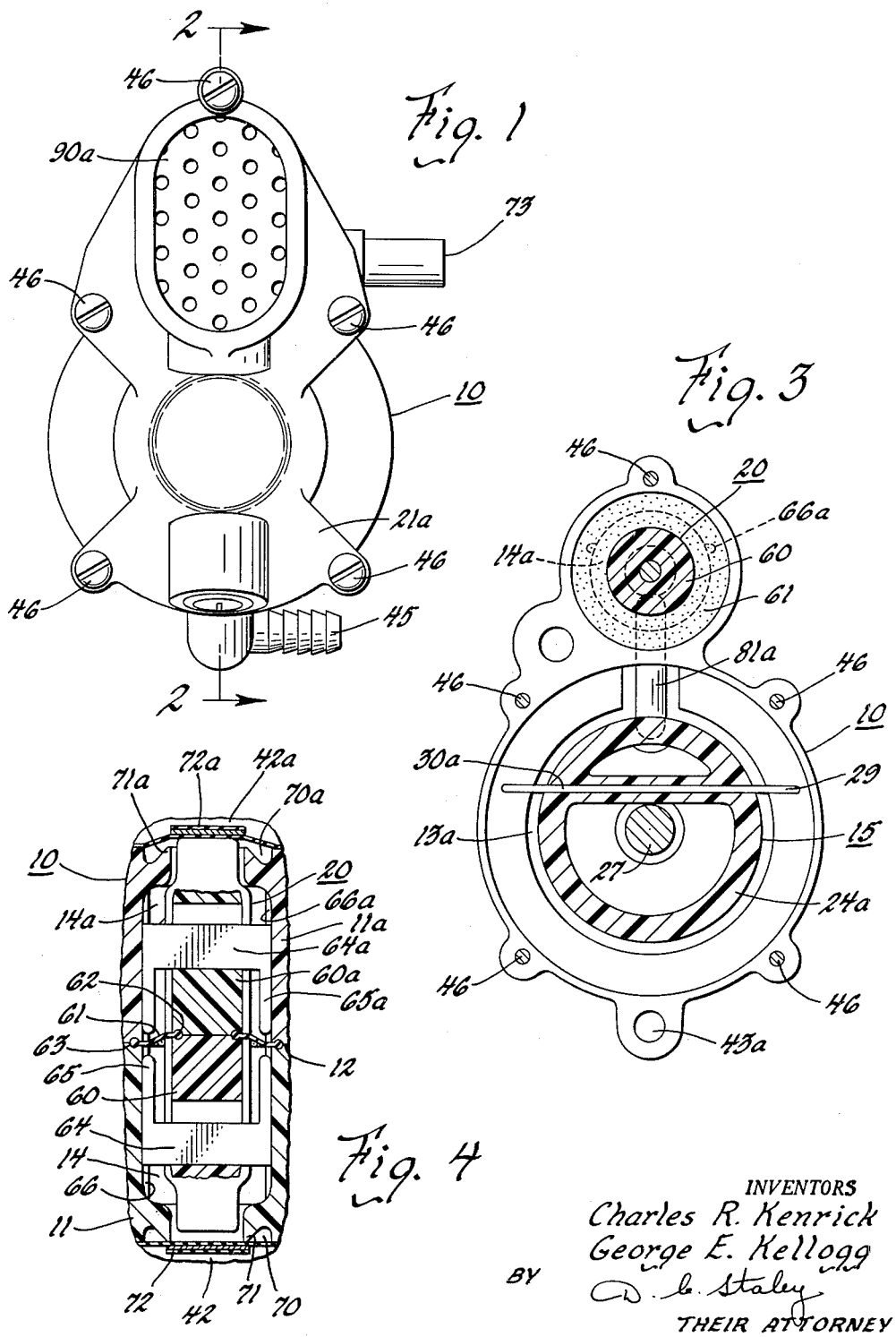

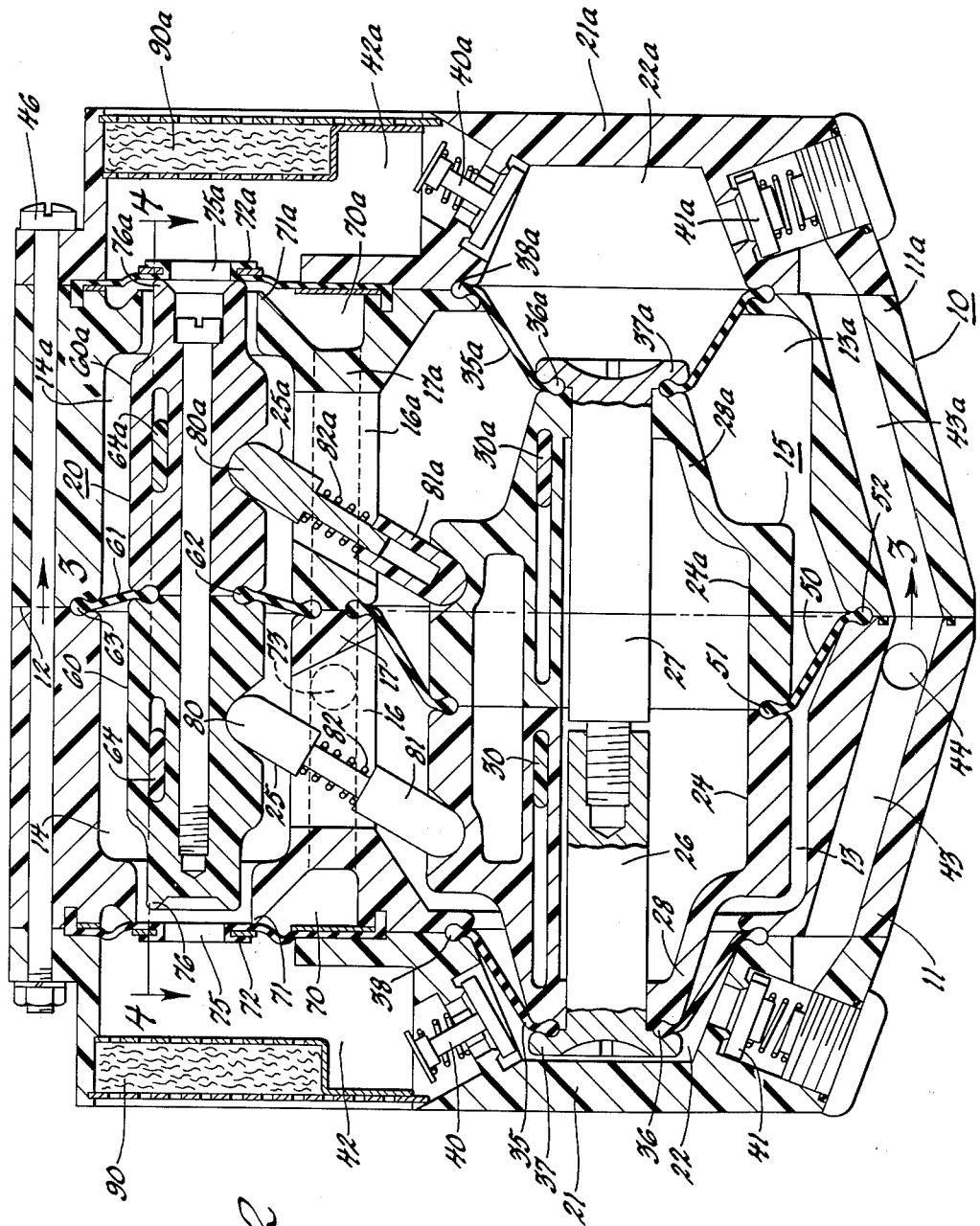

3,056,543
VACUUM OPERATED AIR PUMP
Charles R. Kenrick, Waynesville, and George E. Kellogg, Miamisburg, Ohio, assignors to General Motors Corporation, Detroit, Mich., a corporation of Delaware
Filed Oct. 10, 1960, Ser. No. 61,590
4 Claims. (Cl. 230—162)

This invention relates to an air pump adapted to be operated by a subatmospheric pressure, or vacuum, that may be obtained from the manifold of the engine of a vehicle on which the pump is used to provide a source of air under pressure. The air pump is particularly adapted for use on automotive vehicles to provide a source of air pressure for the operation of auxiliary components on the vehicle, such as windshield wipers, air pressure operated power brake devices and others.

It is therefore an object of this invention to provide an air pump adapted for use on an automotive vehicle for operation from a vacuum source such as the manifold of the engine of the vehicle which will be relatively inexpensive to manufacture and will be trouble free over a long period of time.

It is another object of the invention to provide a vacuum operated or subatmosphere pressure operated air pump adapted for use on an automotive vehicle that has a minimum of engaging friction surfaces so as to require substantially no lubrication of the device over its normal lifetime, the primary movable parts of the device being movable in a gaseous atmosphere so as to eliminate friction of engaging surfaces, and guide elements for the primary movable parts that do require friction engagement with the movable parts being constructed of a self-lubricating material and thereby eliminate necessity of further lubrication of the device during its normal life.

Further objects and advantages of the present invention will be apparent from the following description, reference being had to the accompanying drawings, wherein a preferred embodiment of the present invention is clearly shown.

In the drawings:

FIGURE 1 is an elevational end view of a vacuum operated air pump of this invention.

FIGURE 2 is a vertical cross-sectional view of the air pump taken along line 2—2 of FIGURE 1.

FIGURE 3 is a transverse cross-sectional view of the air pump taken along line 3—3 of FIGURE 2.

FIGURE 4 is a partial cross-sectional view illustrating the slide guide for the operating valve element of the air pump.

In this invention the vacuum operated air pump consists of a body 10 composed of two substantially identical body parts 11 and 11a adapted to be assembled together along the parting line or dividing line 12. The body part 10a has a cavity 13 that aligns coaxially with a similar cavity 13a in a body part 11a.

The body part 11 is also provided with a cavity 14 that aligns coaxially with a similar cavity 14a in the body part 11a. The cavities 13 and 13a receive a piston member 15 more fully described hereinafter and the cavities 14 and 14a receive a valve and valve actuating member 20 more particularly described hereinafter. The cavity 13 communicates with the cavity 14 through a slot passage 16 provided in the wall 17 of the body part 11. The cavity 13a communicates with the cavity 14a through a similar slot passage 16a provided in the wall 17a of the body part 11a.

The valve member 20 is connected with the piston 15 by means of the over-center actuating devices 25 and 25a for alternate and opposite movement of the valve member 20 relative to the piston 15 in a manner hereinafter more fully described.

The body part 11 of the pump supports an end wall 21 that closes the cavity 13. The body part 11a supports a similar end wall 21a that closes the cavity 13a. The end wall 21 has a cavity 22 that is coaxial with the cavity 13 and the end wall 21a has a cavity 22a that is coaxial with the cavity 13a. Thus cavities 22 and 22a are in coaxial alignment and are coaxial with the piston 15.

The piston 15 is constructed of two identical body parts 24 and 24a that are held together by the stud members 26 and 27, member 27 threading into the end of member 26.

The body part 24 of the piston 15 has a formed end portion 28 that conforms substantially to the shape of the cavity 22 in the end member 21. Similarly, the body part 24a has a shaped end portion 28a that conforms substantially to the shape of the cavity 22a in the end wall 21a, cavities 22 and 22a being of identical contour to receive the end portions 28 and 28a respectively of the piston 15. The piston 15 is slidably supported by a guide member 29 that has the two leg portions 30 and 30a supporting the body parts 24 and 24a respectively, as shown in FIGURE 2. This guide member 29 is similar to one which also supports the valve member 20 hereinafter more fully described.

A diaphragm member 35 has its inner end 36 clamped between the enlarged head 37 on the stud 26 and the formed portion 28 on the body part 24 of the piston 15. The outer end 38 of the diaphragm 35 is secured between the body part 11 of the pump and the end wall 21, thereby forming one wall of the cavity 22 that forms a pump cavity for compressing air. The pump cavity 22 is provided with a suction inlet valve 40 and a pressure discharge valve 41, air under atmospheric pressure being taken in through the air inlet cavity 42 in the end wall 21 through the suction valve 40 and compressed or discharged through the exhaust valve 41 into the exhaust or discharge passage 43 that delivers air under pressure into the exhaust port 44 of the fitting 45.

Similarly, the diaphragm 35a has its inner end 36a retained between the enlarged head 37a of the stud 27 and the formed end 28a of the piston 15. The outer end 38a of the diaphragm 35a is retained between the body part 11a of the pump 10 and the end wall 21a, the diaphragm 35a thereby forming a wall of the pump cavity 22a.

The pump cavity 22a is provided with the suction inlet valve 40a and with the compressed air discharge valve 41a by which air is taken in from the inlet chamber 42a in the end wall 21a through the inlet valve 40a and is discharged through the exhaust valve 41a into the exhaust passage 43a that also connects with the part 44 of the fitting 45. The body parts 11, 11a and the end valves 21 and 21a are held together by a plurality of through bolts 46.

The piston 15 supports a diaphragm member 50 that has its inner end 51 secured between the body parts 24 and 24a of the piston and has its outer end 52 secured between the body parts 11 and 11a of the pump thereby dividing the piston receiving chamber formed by the cavities 13 and 13a into separate power chambers 13 and 13a that are separated by the diaphragm 50, the diaphragm 50 forming the power diaphragm for reciprocating the piston between the pump chambers 22 and 22a.

Power for operating the piston 15 is obtained by introducing atmospheric pressure into the power chamber 13 while introducing a subatmospheric pressure or vacuum into the power chamber 13a, thereby creating a pressure differential on opposite sides of the diaphragm 50 which causes the piston to be moved in the direction of the lower pressure in the chamber 13a. The introduction of atmospheric air pressure and subatmospheric pressure into the chambers 13 and 13a is controlled by the valve member 20 to effect alternation of the relationship of the atmosphere pressure and the subatmosphere pressure so as to alternate the direction of the pressure differential at opposite sides of the diaphragm 50 and thereby produce reciprocation of the piston 15 between the pump cavities 22 and 22a.

The valve member 20 that controls the introduction of atmosphere pressure or subatmosphere pressure alternately into the power chambers 13 and 13a is a dual acting valve device consisting of the two body parts 60 and 60a that are located in the valve chambers 14 and 14a respectively. The valve chambers 14 and 14a are separated by a diaphragm 61 that has its inner end 62 clamped between the body parts 60 and 60a of the valve member 20 while the outer end 63 of the diaphragm 61 is clamped between the body parts 11 and 11a of the pump, thereby separating chambers 14 and 14a. Thus valve chamber 14 can be at the same pressure as power chamber 13 while valve chamber 14a is at the same pressure as power chamber 13a.

The body parts 60 and 60a of the valve 20 are slidably supported on the fingers 64 and 64a of the slide guide members 65 and 65a respectively, as shown in FIGURES 2 and 4, the slide guide members 65 and 65a being in the form of U-shaped members received in the recesses 66 and 66a in the body parts 11 and 11a of the pump.

The body parts 11 of the pump have the chamber 70 provided with an annular seat 71 that is engaged by a diaphragm valve element 72 to close the chamber 70, the valve element 72 being unbalanced in the direction of closing by the differential of pressure on opposite sides of the diaphragm valve element in the chamber 42 and in the chamber 70 that is connected with a subatmospheric source of pressure such as the manifold of the engine of a vehicle on which the pump is used through a port 73.

Similarly, the body part 11a has a chamber 70a that has an annular valve seat 71a on which a diaphragm valve element 72a is adapted to seat to close the chamber 70a in the same manner that valve element 72 closes chamber 70, even though the valve element 72a is shown as being lifted from its valve seat 71 in the drawing in FIGURE 2.

The diaphragm valve element 72 has a central opening 75 that communicates with the air inlet chamber 42 for supply of atmospheric air pressure from the chamber 42 into the valve chamber 14, wherein the closing valve seat 76 on the body part 60 of the valve member 20 is lifted from the valve element 72 in the manner shown in FIGURE 2.

Similarly, the diaphragm valve element 72a has a central opening 75a through which atmospheric air under pressure can flow from the inlet chamber 42a into the valve chamber 14a when the valve seat 76a on the end of the body part 60a of the valve member 60 is removed from the diaphragm valve element 72a.

The slide guide member 29 and 65 for the piston 15 and the valve element 20 respectively are both made of a self-lubricating material which may be an acetal resin such as "Delrin" or a tetrafluoroethylene resin such as "Teflon" both of which are manufactured by the E. I. du Pont de Nemours & Co. of Wilmington, Delaware, so that the sliding surfaces of engagement between the slide guide members 29 and 65 with their respective piston 15 and valve elements 20 will not require lubrication during the normal life of the air pump.

As shown in FIGURE 2, the valve element 20 is in a position to allow the flow of atmosphere pressure into the valve chamber 14 and thence into the power chamber 13 while a subatmosphere pressure, or vacuum, is supplied into the valve chamber 14a from the subatmosphere, or vacuum, chamber 70 and thence into the power chamber 13a. The mechanism as shown in FIGURE 2 is thus in a position for the atmosphere pressure in chamber 13 to drive the piston member 15 in the right-hand direction to compress air under pressure in the chamber 22a. Movement of the piston 15 in the right-hand direction will cause the over-center actuating devices 25 and 25a to shift the valve member 20 in a left-hand direction after the piston has passed through a part of its reciprocal stroke.

The over-center actuating devices 25 and 25a consist of the pins 80 and 80a that engage the valve body parts 60 and 60a respectively and the sleeves 81 and 81a that engage the body parts 24 and 24a respectively of the piston 15. Compression springs 82 and 82a of the respective over-center devices 25 and 25a retain the devices in an extended position in engagement with the respective piston and valve element parts.

Thus, when the piston 15 moves in the right-hand direction from the position shown in FIGURE 2 the lower end 81 of the over-center device 25 moves in a right-hand direction until it reaches a position in vertical alignment with the upper end 80 of the over-center device 25. Concurrently the parts of the over-center device 25a are moving similarly. Slight additional movement of the piston 15 in the right-hand direction will then cause the over-center devices to apply their force against the valve element 20 to move it in the left-hand direction. Such action will allow the valve element 72a to seat on the valve seat 71a and unseat valve seat 76a from the valve element 72a. Concurrently valve seat 76 seats on the valve element 72 to close the atmosphere port 75 and move the valve element 72 away from the valve seat 71 to open the subatmosphere or vacuum chamber 70 to the valve chamber 14. Thus, the pressure differential on opposite sides of the diaphragm 50 is reversed from that shown in FIGURE 2 with the subatmosphere, or vacuum, pressure now being present in chamber 13 with atmosphere pressure being present in chamber 13a so that the piston 15 will be moved in a left-hand direction to compress air in the chamber 22.

The pins 80 and 80a of the over-center devices 25 and 25a may be made of stainless steel while the sleeves 81 and 81a may be made of self-lubricating plastic material such as the "Delrin" resin or the "Teflon" resin heretofore mentioned to eliminate any problem of lubrication between the sliding and moving parts as well as corrosion resulting from moisture within the atmospheric air that passes into and out of the chambers 13 and 13a respectively. The piston parts and the parts of the valve 20 can be made from thermosetting plastic materials or noncorrosive metals to eliminate any corrosion problem by long contact with air during operation of the pump.

From the foregoing description, it will be apparent that the available vacuum to chambers 13 and 13a, establishing the working pressure differential at opposite sides of the diaphragm 50, controls the maximum air pressure that is developed by the pump. Whenever the force effect of the pressure differential at opposite sides of the diaphragm 50 is balanced against the force effect of the air pressure being developed, the pump will stop operating until these forces become unbalanced. This has the effect of pressure regulation without the need of a pressure regulator. Also, the pump does not operate so long as the air pressure is at the predetermined maximum value.

The air inlet chamber 42 is provided with an air filter 90 and the air chamber 42a is provided with a similar air filter 90a to eliminate dirt from entering the pump chamber through the air inlet valves 40 and 40a respectively and being passed on through the system through the discharge valves 41 and 41a.

While the embodiment of the invention as herein disclosed constitutes a preferred form, it is to be understood that other forms might be adopted.

What is claimed is as follows:

1. In a pump structure, a housing defining a pair of coaxially spaced pump chambers, a diaphragm wall closing one side of each chamber, said walls defining a piston chamber between said spaced chambers, a piston member within said piston chamber and engaging the diaphragm wall of each of said spaced chambers to compress gas alternately in said spaced chambers upon reciprocal movement of said piston member in said piston chamber, a diaphragm member dividing said piston chamber into two separate power chambers at opposite sides of said diaphragm member, said diaphragm member being fixedly sealed to said piston member and to the housing and valve means adjacent said power chambers controlling admission of atmosphere pressure and subatmosphere pressure alternately to each of said power chambers alternately and effect thereby a pressure differential at opposite sides of said diaphragm member applied to said diaphragm member alternately in opposite directions to reciprocate thereby said piston member.

2. In a pump structure, a housing defining a pair of coaxially spaced pump chambers, a diaphragm wall closing one side of each chamber, said walls defining a piston chamber between said spaced chambers, a piston member within said piston chamber and engaging the diaphragm wall of each of said spaced chambers to compress gas alternately in said spaced chambers upon reciprocal movement of said piston member in said piston chamber, a diaphragm member dividing said piston chamber into two separate power chambers at opposite sides of said diaphragm member, said diaphragm member being fixedly sealed to said piston member and to the housing, valve means adjacent said power chambers controlling admission of atmosphere pressure and subatmosphere pressure alternately to each of said power chambers alternately and effect thereby a pressure differential at opposite sides of said diaphragm member applied to said diaphragm member alternately in opposite directions to reciprocate thereby said piston member, and valve actuating means extending between said piston member and said valve means to actuate the same alternately oppositely to movement of said piston member.

3. In a pump structure, a housing defining a pair of coaxially spaced pump chambers, a diaphragm wall closing one side of each chamber, said walls defining a piston chamber between said spaced chambers, a piston member within said piston chamber and engaging the diaphragm wall of each of said spaced chambers to compress gas alternately in said spaced chambers upon reciprocal movement of said piston member in said piston chamber, a diaphragm member between said piston member and the wall of said piston chamber dividing said piston chamber into two separate power chambers at opposite sides of said diaphragm member, a valve chamber adjacent said power chambers containing a dual acting valve means comprising concurrently acting valve means therein, a diaphragm element between said valve means and the wall of said valve chamber dividing said valve chamber into two separate valve chambers at opposite sides of the diaphragm element each containing one of the valve members of the dual acting valve means, said valve chambers each being in fluid connection with one of said power chambers for supply of fluid thereto under control of the respective valve members, each of said valve members controlling admission of atmosphere pressure and subatmosphere pressure alternately to the respective power chamber controlled thereby and effect thereby a pressure differential at opposite sides of said diaphragm member applied to said diaphragm member alternately in opposite directions to reciprocate said piston member, and valve actuating means extending between said piston member and said valve means to actuate the same thereby alternately oppositely to movement of said piston member.

4. A pump structure constructed and arranged in accordance with claim 3 in which each of said valve members includes a movable valve element having a valve seat, a coaxially arranged fixed valve seat defining a fluid pressure chamber, and a diaphragm element engageable with said fixed valve seat to close the fluid pressure chamber defined thereby and having a central opening therein for fluid pressure flow therethrough from a separate source and engageable by said seat of said movable valve element annularly around said central opening to close the same against fluid flow therethrough.

References Cited in the file of this patent
UNITED STATES PATENTS

| | | |
|---|---|---|
| 514,608 | Weatherhead | Feb. 13, 1894 |
| 2,625,886 | Browne | Jan. 20, 1953 |